United States Patent [19]
Meidhof

[11] Patent Number: 5,635,222
[45] Date of Patent: Jun. 3, 1997

[54] STRAND CASTER FOR A STRAND CASTING SYSTEM, IN PARTICULAR FOR THERMOPLASTIC PLASTICS

[75] Inventor: Helmuth Meidhof, Grossostheim, Germany

[73] Assignee: Rieter Automatik GmbH, Germany

[21] Appl. No.: 443,369

[22] Filed: May 17, 1995

[30] Foreign Application Priority Data

Jun. 3, 1994 [DE] Germany .......................... 44 19 555.9

[51] Int. Cl.⁶ .......................................... D01D 4/08
[52] U.S. Cl. ........................... 425/192 S; 264/176.1; 425/382.2; 425/463; 425/464
[58] Field of Search .................. 425/192 S, 192 R, 425/191, 464, 461, 376.1, 131.5, 72.2, 382.2, 463; 264/176.1, 177.13

[56] References Cited

U.S. PATENT DOCUMENTS

| 3,259,938 | 7/1966 | Martin ........................ 425/464 |
| 3,302,240 | 2/1967 | Loos ........................... 425/190 |
| 3,425,091 | 2/1969 | Ueda et al. .................. 425/190 |
| 3,460,199 | 8/1969 | Heckrotte et al. ........ 425/191 S |
| 5,286,323 | 2/1994 | Bagley ........................ 425/464 |

FOREIGN PATENT DOCUMENTS

| 501497 | 7/1930 | Germany ..................... 425/464 |
| 1928738 | 7/1963 | Germany . |
| 43-20251 | 8/1968 | Japan ...................... 425/192 S |
| 721863 | 1/1955 | United Kingdom ......... 425/464 |

*Primary Examiner*—Jay H. Woo
*Assistant Examiner*—Duane S. Smith
*Attorney, Agent, or Firm*—Banner & Witcoff, Ltd.

[57] ABSTRACT

A strand caster, in particular for plastic strand casting systems, is provided, which in a known fashion consists of a nozzle plate and a caster. The nozzle plate and the caster include abutment surfaces facing each other, and the nozzle plate is mountable to the caster by corresponding mounting elements. The surface structure of at least one abutment surface of the nozzle plate or respectively the caster is adapted such that, due to the fastened state caused during operation, the one abutment surface accommodates to the opposing other abutment surface under tension so that an uniform surface pressing between the nozzle plate and the caster is achievable.

13 Claims, 2 Drawing Sheets

STRAND CASTER FOR A STRAND CASTING SYSTEM, IN PARTICULAR FOR THERMOPLASTIC PLASTICS

FIELD OF THE INVENTION

The invention relates to a strand caster which includes a nozzle plate and a caster, wherein the nozzle plate and caster have abutment surfaces facing each other.

BACKGROUND OF THE INVENTION

A strand caster for strand casting systems, in particular for thermoplastic plastics, commonly consists of a nozzle plate attached to a caster by screws, whereby the nozzle plate and the caster comprise even abutment surfaces facing each other.

Similar to many other applications, a surface pressing, with parts to be connected, screwed or clamped to one another, should be achieved to be as uniform as possible on the abutment surfaces during operation especially by a large number of mounting elements distributed as uniform as possible in order to prevent a leakage as is the case with strand casters. Even with parts which are to be connected, in which in their interior no additional, for example hydraulically caused pressure acts, a deterioration of the surface pressing at even parts between the mounting elements, for example screws or clamp elements, arranged at certain pitch spacing can physically not be prevented.

With a strand caster generally a nozzle plate is mounted to a caster with a number of mounting elements near its outer periphery. Since the nozzle plate as well as the caster are subject to an additional inner pressure load, caused by the extruding process, a gap between the nozzle plate and the caster can occur, which would lead to leakage. In order to prevent this from occurring, often with strand casting arrangements one or more sealing means are used between the nozzle plate and the caster in connection with a large number of screws. The larger the number of screws, the more uniform the surface pressing between the nozzle plate and the caster can be realized. A large number of screws, however, stands in the way of a repair-friendly arrangement and leads to a decreasing exchange-ability of the nozzle plate.

SUMMARY OF THE INVENTION

The object of the invention, therefore, lies in providing a strand caster with which the nozzle plate is mountable to a caster without sealing means by a reduced number of mounting elements.

According to the invention, a strand caster is provided, in particular employed in strand casting systems for thermoplastic plastics, in which the abutment surfaces, which face each other, of a nozzle plate and a caster are adapted such that, during operation, the surface structure of at least one of the abutment surfaces can, under pressure, accommodate the other, opposing abutment surface so that an uniform surface-pressing between the nozzle plate and the caster is achievable.

The surface-pressing of the abutment surfaces engaging under pressure is to be determined for a respectively desired load. At points of high surface pressure, a material excavation or a surface reduction, respectively, occurs. At points of minimal surface pressure, the surface remains as it was. After a number of iterations, the optimal surface structure is obtained.

In an unfastened state and with loosely engaging abutment surfaces, therefore, gaps occur between the abutment surfaces. The higher the pressure force, which can be expected to act on the respective positions, the larger the resulting gaps are.

Since hereby this can result in a quite complicated surface structure, which is also difficult to create, in many cases it is possible to only realize a simplified surface structure, which also only enables an approximately uniform surface-pressing.

Preferably, at least one of the two abutment surfaces is no longer even, rather is at least in one direction with respect to its surface structure adapted to be curved, respectively, convexed. The abutment surfaces have one radius or a number of radii of curvature with respect to their surface structure. The surface structure of the abutment surfaces for reasons of preventing tension peaks, i.e. for accomplishing an uniform surface pressing, has continuous transitions between the radii of curvature. The surface structure of the abutment surfaces with the exception of their edges, therefore, is free of jumps in the geometry and does not comprise surface steps.

The surface structure of at least one of the abutment surfaces can be uniformly leveled in the entire region of the mounting elements, respectively can have a uniform curvature, or recesses can also be provided in the surface in the regions of each individual mounting element. The abutment surfaces, therefore, have a surface structure such that in the case when screws are used as mounting elements, these screws "lie hollow" directly under the head of a screw, respectively when clamp elements are used, these clamp elements "lie hollow" directly under the clamp position, prior to mounting of the nozzle plate to the caster, i.e. they are adapted to have a certain gap while the abutment surface of the nozzle plate and the abutment surface of the caster are in a direct surface-contact in the separation between the individual mounting elements. In a particular favorable manner, therefore, during tightening of the screws, respectively of the clamp elements, during fastening of the nozzle plate to the caster, this results in that both abutment surfaces are forced by means of the elastic bending of the curved surface to accommodate the opposing abutment surface during a contact of the surfaces.

For certain applications it can be beneficial to deviate from the essentially even shape of the nozzle plate and the caster, and to provide both building parts of the strand caster with corresponding radii, so that the abutment surface of the nozzle plate as well as the abutment surface of a caster have a spherical or cylindrical shape. Recesses are incorporated in the spherical or cylindrical surface, in analogy to the essentially even nozzle plate-caster system, with respect to an imagined spherical or cylindrical surface in at least one of the abutment surfaces so that by using the elasticity of the components the abutment surfaces during fastening of the nozzle plate to the caster are equally accommodate each other.

In order to ensure a re-usability either of the nozzle plate or of the caster in combination with respectively another form of the respectively other opposing component, the deviation of the surface structure of the abutment surfaces from the ideally imagined shape, as for example the even shape or the spherical, respectively the cylindrical surface shape, is adapted such that during operation the tension and/or the expansion lie/lies within the region according to Hook's Law.

BRIEF DESCRIPTION OF THE DRAWINGS

Further advantages, features and possibilities of application of the present invention can be obtained from the following description of the embodiments in combination with the drawing. In the drawing.

DETAILED DESCRIPTION OF THE PREFERRED EMBODIMENTS

Figure 1A:
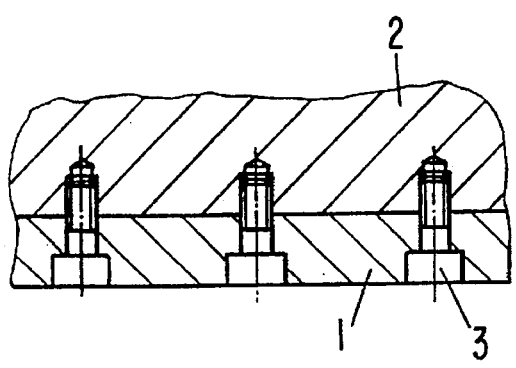
FIGS. 1a and 1b shows the surface pressing distribution for a nozzle plate mounted with screws along a line to a caster, whereby the line connects the individual mounting screws for the region of the mounting screws at the outer edge of the nozzle plate parallel to a row of nozzles.
Figure 1B:
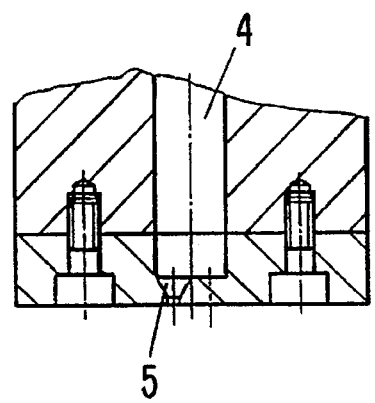
Figure 1C:
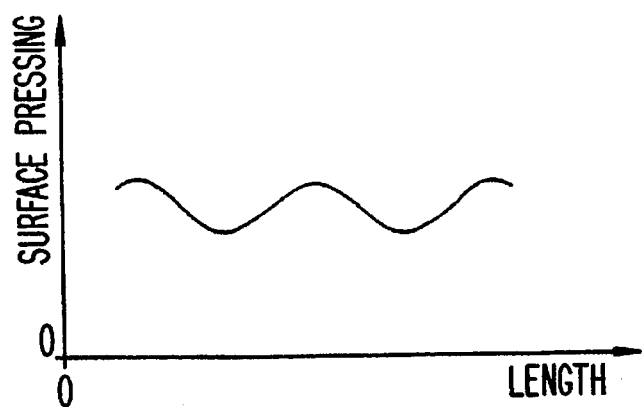
FIGS. 1c and 1d shows the surface pressing distribution for a nozzle plate mounted with screws along a line to a caster, whereby the line connects the individual mounting screws for the region of the mounting screws close to the actual nozzles.
Figure 1D:
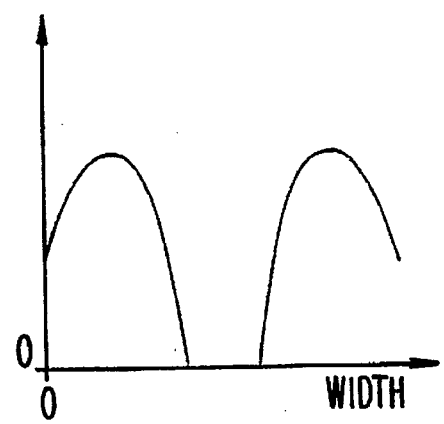

In FIG. 1, a section of the nozzle region of a strand caster comprising a nozzle plate 1 and a caster 2 is illustrated. FIG. 1a shows screws 3 pressing the nozzle plate 1 with its even abutment surface against the caster 2 provided too with its even abutment surface, during operation, i.e. in a condition of exerted tension caused by this operation. In FIG. 1c the surface pressing distribution, corresponding to such an exerted tensioning, of the separation joint is presented in a qualitative illustrative manner. FIG. 1b shows the same section of the strand caster, however, as a cross-sectional view in a transverse direction to the presentation of FIG. 1a, namely directly through the nozzle region. The nozzle 5 as well as the corresponding borings for holding the mounting screws 3 are located in the nozzle plate 1. Alternatively, screws 3 could be replaced with other mounting elements such as slide rails or tension clamps. In the interior of caster 2 a cavity 4 is provided by means of which the thermoplastic plastic is fed to the nozzle 5 in a condition in which it is heated to a plastic state. Since this heating of the plastic occurs in the caster by means of a corresponding heating means, the caster is often also referred to as a so-called heating chamber. The abutment surfaces, which face each other, of the nozzle plate 1 as well as the one of the caster 2 are adapted to be even. FIG. 1d shows the corresponding shape of the curve of the surface pressing equally in a qualitative presentation. This shape shows the pronounced peak values of the surface pressing in the immediate region of the mounting screws and regions where the surface pressing is equal to zero in the region of the nozzles. The surface pressing equal to zero confirms that in the region of the nozzles due to the inner pressure of the plastic, which with conventional strand casters lies in a region of about 2 to 5 MPa, regions with a surface pressing equal to zero can occur. This means that exactly in the region of the nozzles, a leakage of plastic due to an unachieved sealing between the nozzle plate 1 and the caster 2 can occur in a sideways direction.

In order to avoid this problem, either the nozzle plate 1 or the caster 2 are formed in accordance to the invention such that in view of the elasticity characteristics of the components, which are to be fastened to one another, material sections of at least one abutment surface of these two components (nozzle plate, caster) are excavated such that in a fastened state, i.e. under consideration of the interior pressure present within the strand caster during operation, an engagement of both abutment surfaces 6, 7 to one another results.

Figure 2A:
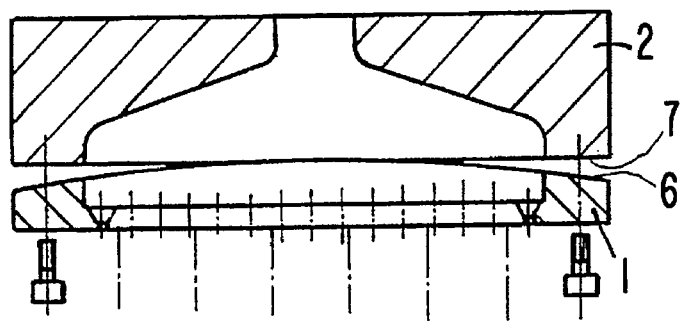
FIGS. 2a and 2b show a first embodiment of the present invention, namely in a principle manner of presentation, whereby the nozzle and the interior of the caster are illustrated in a simplified fashion.

In FIG. 2, in a principle presentation, two embodiments of the present invention are illustrated. In FIG. 2a the nozzle plate 1 is formed with a surface structure of its abutment plate 6 such that the abutment surface 6 has a curved shape with respect to the row of fastening screws arranged laterally adjacent to the nozzle region on both sides of the respective rectangularly shaped nozzle plate and caster. The abutment surface 7 of the caster 2, in the course of this, remains essentially even. With such a curved nozzle plate 1, an engagement of the side regions of the nozzle plate 1, which are curved downwards, with the abutment surface 7 of the caster 2 is accomplished during the fastening of the nozzle plate 1 to the caster 2. At the same time, by means of the middle region of the curved abutment surface 6 in the immediate vicinity of nozzle 5 of the strand caster an increase of the surface pressing is accomplished so that, as a total, a more uniform surface pressing in a transverse direction results, and at the same time, it is prevented that also under consideration of the interior pressure present in the strand caster, a gap between the nozzle plate 1 and the caster 2 develops, which would lead to a leaking of the thermo-plastic plastic in a sideways direction.

Figure 2B:
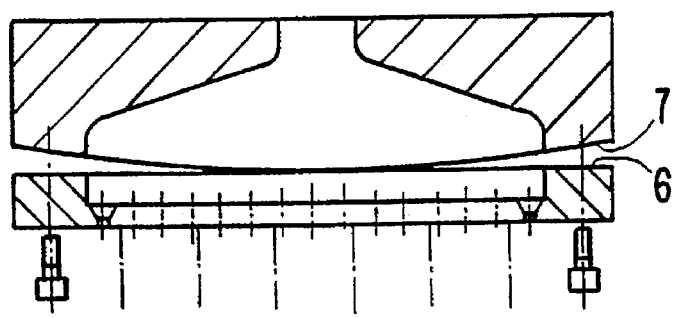

In FIG. 2b, the nozzle plate 1 has an essentially even shape, and the opposing abutment surface 7 of the caster 2 has a curved shape. During fastening of the nozzle plate 1 to the caster 2, the nozzle plate completely conforms to the curved shape of the caster due to its own elasticity, whereby equally a uniform surface pressing is accomplished in direction of the width which equally prevents a sideways leaking of the plastic between the nozzle plate 1 and the caster 2.

With a further embodiment shown in FIG. 3, none of the abutment surfaces 6, 7 of the nozzle plate 1, respectively of the caster 2 are curved in any direction, rather preferably symmetric recesses uniformly arranged are provided in the region of the mounting elements, i.e. the screws for mounting the nozzle plate 1 to the caster 2. These recesses in the region of the mounting screws 3 cause, during the fastening, that the region of the nozzle plate in the immediate region of the head of the screw is pulled to the opposing abutment surface due to the reduction of the material in the region of the recess in combination with the elasticity of the material of the nozzle plate 1, respectively the caster 2, so that in a transverse direction a uniform surface pressing from one mounting screw to the other is obtained.

Figure 3A:
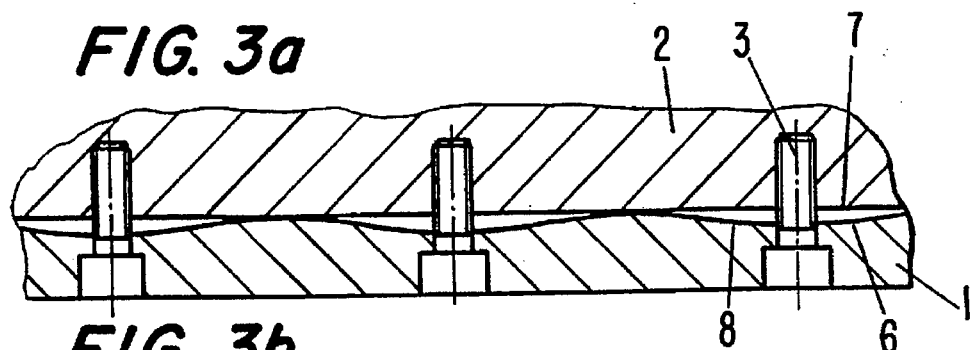
FIG. 3a shows a further embodiment of the present invention with an adapted surface structure of the nozzle plate.
Figure 3B:
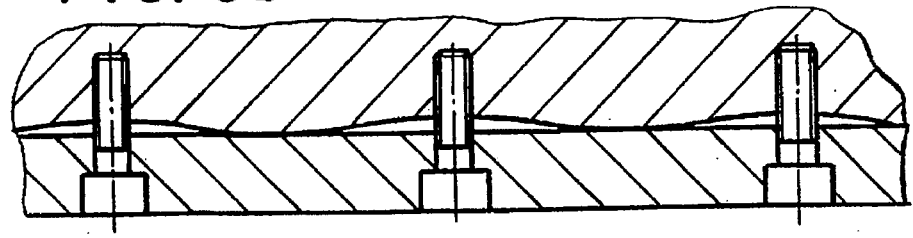
FIG. 3b shows this embodiment with an adapted surface structure for the caster.

In FIG. 3b, the recesses 8 are incorporated into the abutment surfaces 7 of the caster 2, and the nozzle plate 1 with regard to its abutment surface 6, contrary to FIG. 3a, remains essentially even. This last mentioned case is especially then useful, if a large variety of the strand casting profiles is desired so that a large number of different nozzle plates 1 are necessary. In another case it is preferred to incorporate the recesses 8 into the nozzle plate 1 and to leave the abutment surface 7 of the caster 2 to be even.

With yet another embodiment, which is not shown, the abutment surface 6 of the nozzle plate 1 as well as the abutment surface 7 of the caster 2 can comprise recesses 8.

Principally, it is also possible to adapt the nozzle plate as well as the caster to be spherically, respectively cylindrically, whereby the spherical, respectively cylindrical surface then in an analogous manner, as was the case with an even abutment surface, incorporates the corresponding recesses 8.

The manufacturing of curved abutment surfaces can be obtained in a generally known fashion, for example by pressing the component, which is to be formed to be curved, over corresponding supports into a curved form and subsequently grinding the opposing side to an even surface which after release of the component presents the actual curved form. Without warping the component which is to be provided with a curved abutment surface, it is obviously possible to generate the curvature by means of a CNC-controlled surface grinding machine. The recesses in the region of the mounting elements can equally be obtained in a known manner by means of a three-axes controlled CNC-surface grinding machine, or, however, the nozzle plate can be pressed against a correspondingly formed counter surface such that in a condition of exerted tension the exposed surface can be ground to be even by means of a conventional surface grinding machine such that after release of the nozzle plate, held in a state of tension during the grinding, the corresponding continuously created recesses for the mounting screws result at the borings.

According to stiffness, the thickness of material and the inner pressure related thereto, the depth of the recesses, respectively the maximal extent of curvature deviating from the imagined surface preferable lies in a region of >0 to several $1/100$ millimeter.

Simply bent (curved) or double-bent (spherical) abutment surfaces are preferably used with rectangularly formed nozzle plates and casters. With circular nozzle plates, respectively casters, preferably, the surface structure of the abutment surfaces provided with recesses in the regions of the mounting screws is used.

I claim:

1. A strand caster for a plastic strand casting system comprising a relatively thick and rigid nozzle plate and a caster, wherein the nozzle plate and the caster comprise abutment surfaces facing each other, and the nozzle plate is mountable to the caster by means of mounting elements, and wherein the surface structure of at least one abutment surface is adapted such that in the unfastened state predetermined gaps are provided between the abutment surfaces in the area of the mounting elements and due to the fastened state caused during operation the one abutment surface accommodates the opposing other abutment surface under tension so that a uniform surface pressing between the nozzle plate and the caster is achievable.

2. A strand caster according to claim 1, wherein the abutment surfaces include edges and the surface structure of the abutment surfaces with the exception of the edges is free of jumps in the geometry and does not comprise surface steps.

3. A strand caster according to claim 2, wherein the surface structure of at least one abutment surface is adapted to be convexed in at least one direction.

4. A strand caster according to claims 1, 2 or 3 wherein the surface structure of at least one abutment surface is adapted such that the gaps are discrete recesses which surround the mounting elements in an unfastened state.

5. A strand caster according to claims 1, 2 or 3, wherein the surface structure of at least one abutment surface is adapted such that in the region of the mounting elements this abutment surface in an unfastened state comprises recesses with respect to the other abutment surface which has a generally spherical shape.

6. A strand caster according to claims 1 wherein the abutment surface of the nozzle plate comprises the surface structure provided with a curvature necessary for the uniform surface pressing.

7. A strand caster according to claims 1 wherein the abutment surface of the caster comprises the surface structure provided with a curvature necessary for the uniform surface pressing.

8. A strand caster according to claim 1 wherein the nozzle plate and the caster are adapted to be generally rectangular.

9. A strand caster according to claim 1 wherein the mounting elements are screws.

10. A strand caster according to claim 1, wherein the surface structure of the abutment surfaces is adapted such that the fastening of the nozzle plate to the caster during operation lies within the region according to Hook's Law.

11. A strand caster according to claim 1 wherein the nozzle plate and the caster are adapted to be generally circular.

12. A strand caster according to claims 1 wherein the mounting elements are slide rails.

13. A strand caster according to claims 1 wherein the mounting elements are tension clamps.

* * * * *